Aug. 3, 1943.   F. W. CURTIS   2,325,746
METAL CUTTING TOOL WITH INSERTED TEETH
Filed Dec. 21, 1942   2 Sheets-Sheet 1
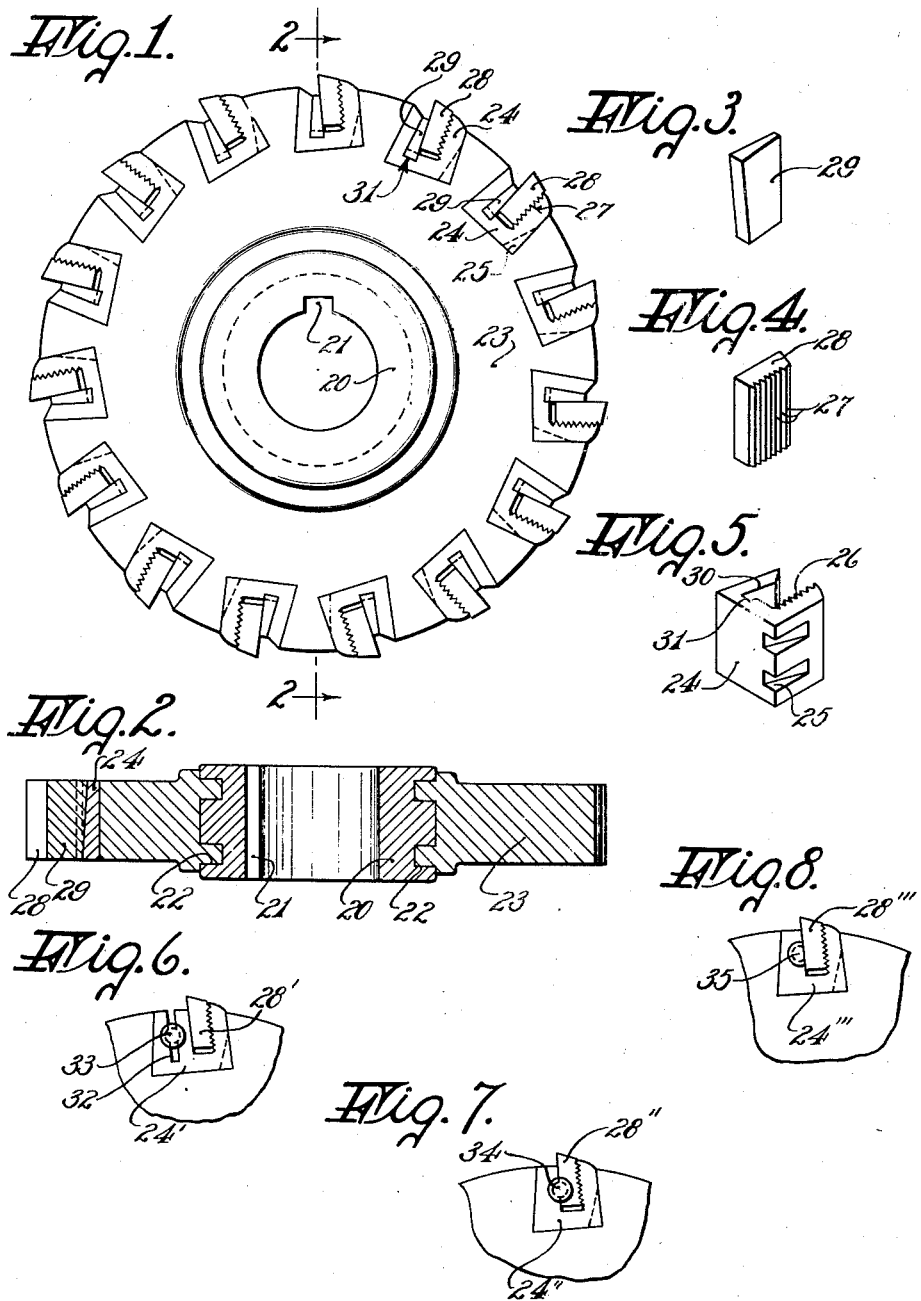
INVENTOR
*Frank W. Curtis*
BY
*Chapin & Neal*
ATTORNEYS

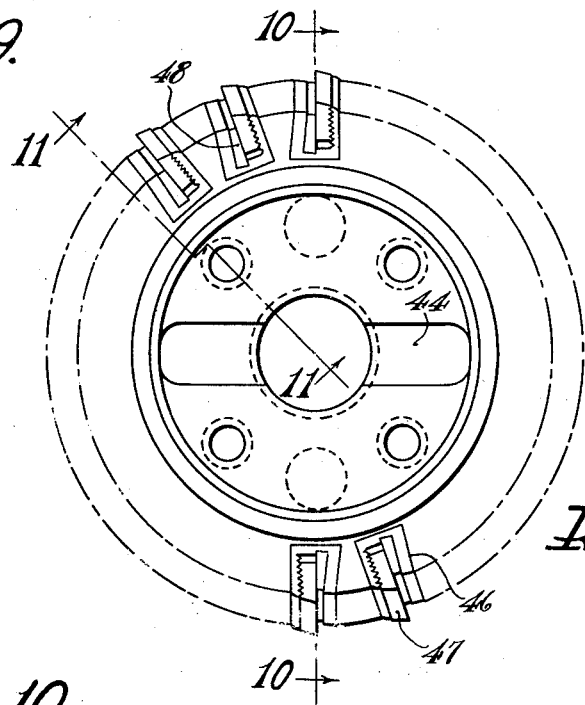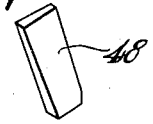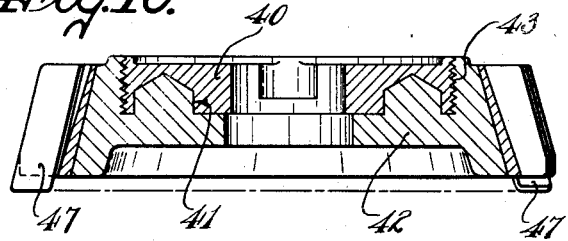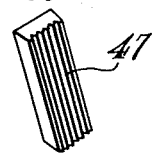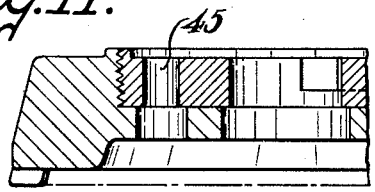

Patented Aug. 3, 1943

2,325,746

UNITED STATES PATENT OFFICE 2,325,746

METAL CUTTING TOOL WITH INSERTED TEETH

Frank W. Curtis, Springfield, Mass., assignor to Van Norman Machine Tool Company, Springfield, Mass., a corporation of Massachusetts Application December 21, 1942, Serial No. 469,659

17 Claims. (Cl. 29—105)

This invention relates to metal cutting tools, of which a milling cutter may be taken as illustrative. In my prior application Serial No. 459,916, filed September 28, 1942, I have disclosed an improved metal cutter in which the cutting blades are mounted relative to the driving portion of the cutter in a matrix of an organic plastic so as to give a slight resilience. It is the object of the present invention to extend and adapt the prior construction to milling cutters having inserted teeth.

Referring to the drawings,

Fig. 1 is a plan view of a milling cutter of ordinary form;

Fig. 2 is a section on line 2—2 of Fig. 1;

Figs. 3, 4 and 5 are details of various parts embodied in the form shown in Fig. 1;

Figs. 6, 7 and 8 are fragmentary views illustrating optional methods of securing the cutting blade in place;

Fig. 9 is a face view of another form of milling cutter;

Fig. 10 is a section on line 10—10 of Fig. 9;

Fig. 11 is a section on line 11—11 of Fig. 9; and

Figs. 12, 13, and 14 are details of construction embodied in the modification of Fig. 9.

Referring first to the form shown in Figs. 1 to 5, the cutter is formed with a central hub portion 20 which may be of steel and provided with a key-way 21 whereby it may be driven from a spindle. Circumferential grooves 22, which may be interrupted at intervals, are provided in the periphery of the member 20 and serve as an anchorage for a body of molded organic plastic indicated at 23. As set forth in my prior application, the type of plastic employed must have certain characteristics, one suitable form being a phenol-aldehyde resin embodying a fibrous filler such as chopped canvas. Molded into the body 23 at intervals around its circumference are holders or sockets 24, preferably of a prismatic form of trapezoidal cross section, the walls of which slant towards each other in an outward direction in order to give a dove-tail effect and hold the sockets in place. Grooves 25 are also preferably formed in at least one surface of the holders 24 to keep them from shifting laterally. One interior face of each holder is preferably provided with serrations 26 which interfit with corresponding serrations 27 on a cutter blade 28. This cutter blade may be of any desired type suitable for the work to be done. A wedge member 29 is received between the wall 30 and the blade 28 and also bears against a tapering groove 31 formed in the bottom of each holder 24. If the wedge is driven in from one side it will press the blade 29 firmly in place against the holder, and at the same time will give a slight expansion to the holder which will hold it firmly in place in the plastic body 23.

Various methods of securing the blade in place may be used, among them those shown in Figs. 6, 7, and 8. In Fig. 6 the holder 24' is slotted at 32, and a taper pin 33 is driven in to expand the slot and press the adjoining wall of the holder against the blade 28'. In Fig. 7 the holder 24'' and the blade 28'' are provided with cooperating tapered grooves between which a pin 34 may be driven. This type of construction is not suitable for cases in which it is desired to adjust the blade radially. In Fig. 8 the holder 24''' is provided with a tapering hole into which a flat-sided pin 35 is driven, the flat side bearing against the blade 28''' and holding it firmly in position.

In Figs. 9 to 14 is illustrated a similar construction adapted for a face mill. In this case the cutter is formed with a central body 40 into which holes or depressions 41 are formed. A moldable organic plastic 42 is molded around the central member 40 and into the depressions. Screw threads or grooves 43 around the periphery of member 40 also serve to bind the member firmly to the plastic. The member 40 is preferably provided with the usual groove 44 to receive a spindle driving dog, and holes 45 may be formed through both the member 40 and the plastic body to receive holding screws for clamping the cutter to the end of the spindle. Peripherally spaced about the plastic body and embedded therein is a series of holders or sockets 46 which are generally similar in construction to those previously described. Since this device is intended to act as a face mill, however, the blades 47 project at one end from the holders and the plastic body and the holders are preferably formed in a conical surface so as to give clearance for the cutting ends of the blades. The wedges 48 may be of any of the types previously described and need not be discussed further.

The forms of cutting tool thus described have the advantage present in previously suggested inserted tooth cutters in that the teeth can be replaced when broken or advanced forwardly to compensate for wear. As contrasted with such prior inserted tooth cutters, however, a cutting of much lighter weight is provided, having improved cutting qualities due to the slight resilience of the cushioning layer of organic plastic. This layer also serves as an insulation, preventing the transfer of heat to the driving spindle which is in some cases objectionable. That an organic plastic could serve as the body of a cutter subjected to the heavy torque and repeated shocks occurring in milling is surprising, but actual tests have shown that cutters having the blades carried by an insulating body of organic plastic not only compare favorably with a solid steel cutter in strength but are quieter in operation and are smoother in their cutting action.

I claim:

1. A cutting tool formed with a central metallic hub portion, a body bonded to the hub portion and composed of a molded organic plastic, a plurality of metallic sockets arranged in a circumferential series about and embedded in the molded body portion and each shaped to anchor said socket against movement in the molded body, a cutter blade received in each socket, and means for securing each blade in its socket.

2. A cutting tool formed with a central metallic hub portion, a body bonded to the hub portion and composed of a molded organic plastic, a plurality of metallic sockets arranged in a circumferential series about and embedded in the molded body portion and each shaped to anchor said socket against movement in the molded body, a cutter blade received in each socket, and wedge means in each socket engageable with the socket and the respective blade to anchor the blade therein.

3. A cutting tool formed with a central metallic hub portion, a body bonded to the hub portion and composed of a molded organic plastic, a plurality of metallic sockets arranged in a circumferential series about and embedded in the molded body portion and each shaped to anchor said socket against movement in the molded body, a cutter blade received in each socket, each said socket having its wall which engages one side of the blade split in a direction generally parallel to the blade, and a wedge pin receivable in said split to secure the blade in its socket.

4. A cutting tool formed with a central metallic hub portion, a body bonded to the hub portion and composed of a molded organic plastic, a plurality of metallic sockets arranged in a circumferential series about and embedded in the molded body portion and each shaped to anchor said socket against movement in the molded body, a cutter blade received in each socket, each said socket having a tapered groove segmental in cross section adjacent one side of the blade, and a tapered flat-sided pin receivable in the groove to wedge the blade in its socket.

5. A cutting tool formed with a central metallic hub portion, a body bonded to the hub portion and composed of a molded organic plastic, a plurality of metallic sockets arranged in a circumferential series about and embedded in the molded body portion and each shaped to anchor said socket against movement in the molded body, a cutter blade received in each socket, each said socket and its blade having registering tapered grooves segmental in cross section, and a tapered pin receivable in the grooves to wedge the blade in its socket.

6. A cutting tool formed with a central metallic hub portion, a generally cylindrical body bonded to the hub portion and composed of a molded organic plastic, a plurality of metallic sockets arranged in a circumferential series about and embedded in the molded body portion and each formed in generally prismatic form with a trapezoidal cross section having a greater circumferential extent toward the axis of the cutter to anchor said socket in the molded body, a cutter blade received in each socket, and means for securing each blade in its socket.

7. A cutting tool formed with a central metallic hub portion, a generally cylindrical body bonded to the hub portion and composed of a molded organic plastic, a plurality of metallic sockets arranged in a circumferential series about and embedded in the molded body portion and each formed in generally prismatic form with a trapezoidal cross section having a greater circumferential extent toward the axis of the cutter to anchor said socket in the molded body, a cutter blade received in each socket, and wedge means in each socket engageable with the socket and the respective blade to anchor the blade therein.

8. A cutting tool formed with a central metallic hub portion, a generally cylindrical body bonded to the hub portion and composed of a molded organic plastic, a plurality of metallic sockets arranged in a circumferential series about and embedded in the molded body portion and each formed in generally prismatic form with a trapezoidal cross section having a greater circumferential extent toward the axis of the cutter to anchor said socket in the molded body, a cutter blade received in each socket, each said socket having its wall which engages one side of the blade split in a direction generally parallel to the blade, and a wedge pin receivable in said split to secure the blade in its socket.

9. A cutting tool formed with a central metallic hub portion, a generally cylindrical body bonded to the hub portion and composed of a molded organic plastic, a plurality of metallic sockets arranged in a circumferential series about and embedded in the molded body portion and each formed in generally prismatic form with a trapezoidal cross section having a greater circumferential extent toward the axis of the cutter to anchor said socket in the molded body, a cutter blade received in each socket, each said socket having a tapered groove segmental in cross section adjacent one side of the blade, and a tapered flat-sided pin receivable in the groove to wedge the blade in its socket.

10. A cutting tool formed with a central metallic hub portion, a generally cylindrical body bonded to the hub portion and composed of a molded organic plastic, a plurality of metallic sockets arranged in a circumferential series about and embedded in the molded body portion and each formed in generally prismatic form with a trapezoidal cross section having a greater circumferential extent toward the axis of the cutter to anchor said socket in the molded body, a cutter blade received in each socket, each said socket and its blade having registering tapered grooves segmental in cross section, and a tapered pin receivable in the grooves to wedge the blade in its socket.

11. A cutting tool formed with a central metallic hub portion, a generally cylindrical body bonded to the hub portion and composed of a molded organic plastic, a plurality of metallic sockets arranged in a circumferential series about and embedded in the molded body portion and each formed in generally prismatic form with a trapezoidal cross section having a greater circumferential extent toward the axis of the cutter to anchor said socket in the molded body, said socket having laterally separated slots to interfit with the molded body portion and radially spaced serrations to interfit with similar serrations on a cutter, a cutter blade received in each socket and having serrations to interfit with those in the socket, and means for securing each blade in its socket.

12. A cutting tool formed with a central metallic hub portion, a generally cylindrical body bonded to the hub portion and composed of a molded organic plastic, a plurality of metallic sockets arranged in a circumferential series about and embedded in the molded body portion and each formed in generally prismatic form with a trapezoidal cross section having a greater circumferential extent toward the axis of the cutter to anchor said socket in the molded body, said socket having laterally separated slots to interfit with the molded body portion and radially spaced serrations to interfit with similar serrations on a cutter, a cutter blade received in each socket and having serrations to interfit with those in the socket, and wedge means in each socket engageable with the socket and the respective blade to anchor the blade therein.

13. A cutting tool formed with a central metallic hub portion, a generally cylindrical body bonded to the hub portion and composed of a molded organic plastic, a plurality of metallic sockets arranged in a circumferential series about and embedded in the molded body portion and each formed in generally prismatic form with a trapezoidal cross section having a greater circumferential extent toward the axis of the cutter to anchor said socket in the molded body, said socket having laterally separated slots to interfit with the molded body portion and radially spaced serrations to interfit with similar serrations on a cutter, a cutter blade received in each socket and having serrations to interfit with those in the socket, each said socket having its wall which engages one side of the blade split in a direction generally parallel to the blade, and a wedge pin receivable in said split to secure the blade in its socket.

14. A cutting tool formed with a central metallic hub portion, a generally cylindrical body bonded to the hub portion and composed of a molded organic plastic, a plurality of metallic sockets arranged in a circumferential series about and embedded in the molded body portion and each formed in generally prismatic form with a trapezoidal cross section having a greater circumferential extent toward the axis of the cutter to anchor said socket in the molded body, said socket having laterally separated slots to interfit with the molded body portion and radially spaced serrations to interfit with similar serrations on a cutter, a cutter blade received in each socket and having serrations to interfit with those in the socket, each said socket having a tapered groove segmental in cross section adjacent one side of the blade, and a tapered flat-sided pin receivable in the groove to wedge the blade in its socket.

15. A cutting tool formed with a central metallic hub portion, a generally cylindrical body bonded to the hub portion and composed of a molded organic plastic, a plurality of metallic sockets arranged in a circumferential series about and embedded in the molded body portion and each formed in generally prismatic form with a trapezoidal cross section having a greater circumferential extent toward the axis of the cutter to anchor said socket in the molded body, said socket having laterally separated slots to interfit with the molded body portion and radially spaced serrations to interfit with similar serrations on a cutter, a cutter blade received in each socket and having serrations to interfit with those in the socket, each said socket and its blade having registering tapered grooves segmental in cross section, and a tapered pin receivable in the grooves to wedge the blade in its socket.

16. A cylindrical milling cutter comprising a central metallic hub portion having peripheral ribs and grooves, a body portion of organic plastic molded to said hub portion and interfitting with said ribs and grooves, a plurality of metallic socket members arranged in a circumferential series about and embedded in the molded body portion and each formed in generally prismatic form with a trapezoidal cross section having a less extent circumferentially of the cutter adjacent the periphery of the body portion the nearer the axis, whereby to anchor said socket in the molded body, said socket having laterally separated slots to interfit with the molded body portion and radially spaced serrations to interfit with similar serrations on a cutter, a cutter blade received in each socket and having serrations to interfit with those in the socket, and wedge means in each socket engageable with the socket and the respective blade to anchor the blade therein.

17. An end mill comprising a hub portion having a disk-like extension toward the periphery of the cutter, said extension having circumferentially spaced undercut portions on at least one lateral face and peripheral ribs and grooves separated axially of the cutter, said hub being shaped to fit upon a spindle and to engage the driving dog thereof, a body portion of organic plastic molded in place about the hub portion and into interengagement with said undercut portions and said ribs and grooves to transmit driving strain from the hub through said body portion, a plurality of metallic sockets molded into said body portion and arranged in a circumferential series upon a conical surface, each socket having its exterior walls formed to engage the molded body portion and prevent axial, circumferential, or radial movement of the sockets in the body portion, cutter blades received in the several sockets and having their cutting faces positioned in a plane at right angles to the axis of the cutter, and means for clamping each cutter blade in its socket.

FRANK W. CURTIS.